W. M. BATEMAN.
HOOKING DEVICE.
APPLICATION FILED JULY 3, 1920.
1,380,631.
Patented June 7, 1921.
2 SHEETS—SHEET 1.
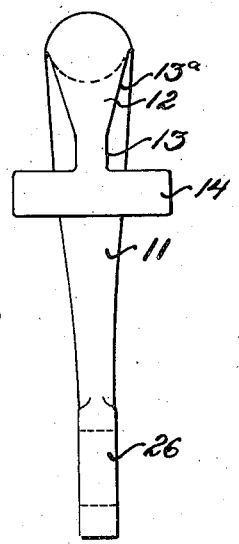
Fig.2
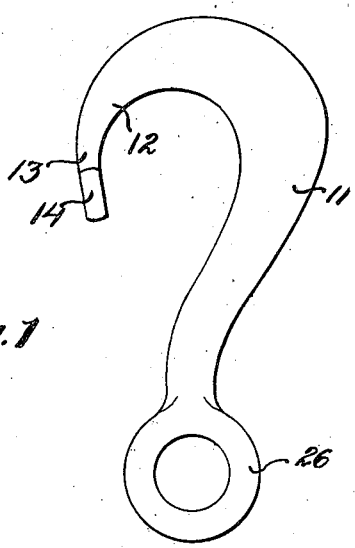
Fig.1
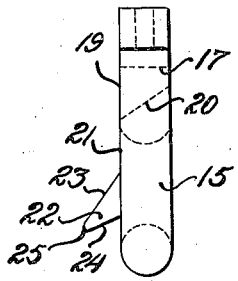
Fig.4
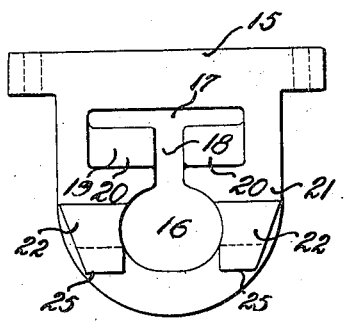
Fig.3
Fig.5
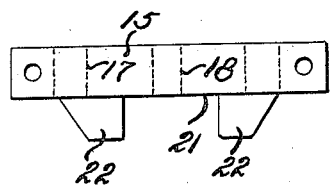
Witnesses
Geo. A. Gruss
Augustus B. Coppes
Inventor
William M. Bateman.
By Joshua R. H. Potts
his Attorney

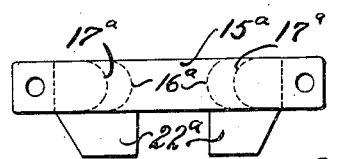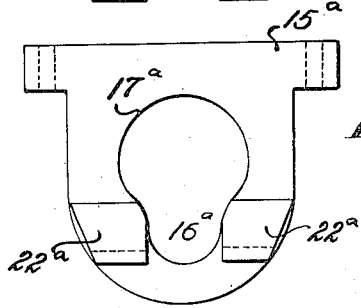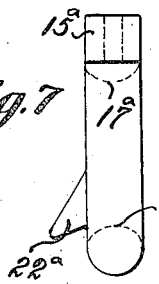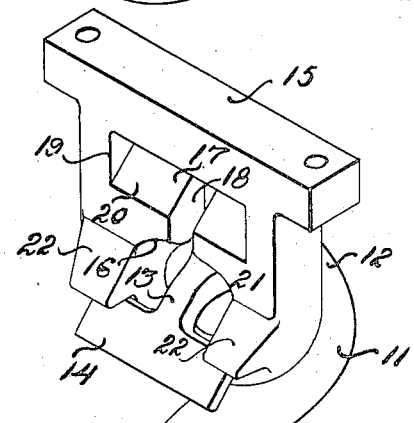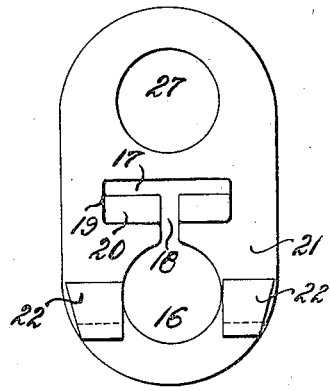

UNITED STATES PATENT OFFICE.

WILLIAM MATHIS BATEMAN, OF NEWARK, DELAWARE.

HOOKING DEVICE.

1,380,631.  Specification of Letters Patent.  Patented June 7, 1921.

Application filed July 3, 1920. Serial No. 393,921.

*To all whom it may concern:*

Be it known that I, WILLIAM M. BATEMAN, a citizen of the United States, residing at Newark, in the county of New Castle and State of Delaware, have invented certain new and useful Improvements in Hooking Devices, of which the following is a specification.

The main object of my present invention is to prevent a hook from accidentally moving out of connection with the element to which it is attached; it being well known that hooks especially when used in connection with movable devices where jarring often occurs frequently jump out of the eyes to which they are connected, with disastrous results.

Another object is to make the device of my present invention of a comparatively simple construction so that it can be used in any place such for example as where a hook is connected either to a bolted eye, chain link, or other means providing an opening into which a hook is to be inserted.

These objects, and other advantageous ends which will be described hereinafter, I attain in the following manner, reference being had to the accompanying drawings in which—

Figure 1 is a face view of a hook constructed in accordance with my present invention, Fig. 2 is an edge view looking in the direction of the front of the hook, Fig. 3 represents an eye which is constructed to form an interlock with the hook to prevent accidental disengagement therewith, Fig. 4 is a side elevation of Fig. 3, Fig. 5 is a top plan view of Fig. 3, Fig. 6 is a perspective view showing the hook in operative connection with the eye, Fig. 7 is a face view of a modified form of eye, Fig. 8 is a side view of Fig. 7, Fig. 9 is a top plan view of Fig. 7, and Fig. 10 is a face view of a link such for example as a chain link which is formed to receive the hook and prevent accidental engagement therewith.

Referring particularly to Figs. 1 to 6 inclusive, my invention comprises a hook 11 provided with an inwardly curved end portion 12; said end portion tapering downwardly as shown at 13$^a$ to a comparatively narrow neck 13 which terminates in a T-head 14. An eye 15 which may be constructed as shown in Figs. 3 to 5 inclusive and either bolted or otherwise secured to a supporting structure includes an aperture 16 which is closed at its bottom and which communicates with a transversely extending slot 17 through the medium of a longitudinal slot or channel 18. The outer portion 19 of said slot is deeper than the rear portion; said construction being provided by a slanting or inclined surface 20 as clearly shown in Figs. 3, 4 and 6. The front surface 21 of the eye has lugs 22 projecting therefrom at either side of the aperture 16; said lugs having upper surfaces 23 which slant downwardly and forwardly from the surface 21. The bottom surface 24 of the lugs 22 slants from the lower edges 25 of the lugs upwardly and rearwardly so as to intercept the surface 21 as clearly shown in Fig. 4.

To connect the hook 11 with the eye 15 the hook 11 is swung so that its connecting end 26 is moved upwardly and the T-head 14 is then inserted through the rear of the slot 17 and the curved end 12 is then moved forwardly and downwardly so that the neck 13 will pass through the channel 18. By again swinging the end 26 of the hook upwardly and at the same time pushing the curved end 12 forwardly, the T-head can be positioned below the lugs 22 such for example as shown in Fig. 6. Practically no amount of swinging movement will possibly disengage the T-head from under the lugs 22, even through the hook accidentally raises, if there is any load whatever or tension exerted upon the end 26.

In Figs. 7 to 9 inclusive I have shown an eye 15$^a$ which embraces the principle above disclosed in connection with the eye 15 with the exception that instead of making a slot in accordance with the slot 17 I have illustrated the aperture 16$^a$ leading to an enlarged portion 17$^a$ and to insert the T-head 14 of the hook it is necessary first to turn the hook slightly in a transverse direction to permit one end of the T-head 14 to be initially projected through the enlarged portion 17$^a$ of the aperture after which the other side of the T-head can be projected through and the hook moved downwardly into position under the lugs 22$^a$; said lugs being preferably constructed similarly to the lugs 22 above described. In Fig. 8 I have shown a link in which the aperture is constructed similarly to the aperture shown in the eye 15 and having the channel and transverse slot portion. In the link of Fig. 10 I also show a hole 27 to permit the link to be attached either to a portion of a chain or other connecting device. With the exception of the hole 27 I have given corresponding parts in Fig. 10 similar reference numerals to parts described in connection with the eye 15. It will be understood that the hook 11 can be connected with the link shown in Fig. 10 in the same manner as described in connection with said eye 15.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a hook having an enlarged engaging end; and means for attachment with the hook including an aperture having an enlarged portion into which the enlargement of the hook is initially inserted whereby when tension is relatively imposed upon said means and hook, the enlargement of the hook will be moved into a position adjacent the smaller part of the aperture with the comparatively narrow portion of said hook in the small portion of the aperture, said means having a lug projecting therefrom, the part of the hook including said enlarged engaging end being of sufficient length to cause said enlarged portion of the hook to engage under the lug; substantially as described.

2. A device of the character described including a hook having a comparatively narrow neck terminating in a substantially T-head; means for attachment with the hook including an aperture having an enlarged portion through which the T-head of the hook can be initially inserted whereby when tension is imposed relatively to said hook and said means, the neck of the hook will be moved into the smaller portion of said aperture; and a lug projecting from said means, said neck of the hook being of sufficient length to permit said T-head to engage under said lug; substantially as described.

3. A device of the character described including a hook having a comparatively narrow neck terminating in a substantially T-head; means for attachment with the hook including an aperture having an enlarged portion through which the T-head of the hook can be initially inserted whereby when tension is imposed relatively to said hook and said means the neck of the hook will be moved into the smaller portion of said aperture; and a lug projecting from said means and under which the T-head of the hook is adapted to engage, said lug having an under surface slanting upwardly and rearwardly and intercepting the forward surface of said means; substantially as described.

In testimony whereof I have signed my name to this specification in the presence of two subscribing witnesses.

WILLIAM MATHIS BATEMAN.

Witnesses:
 ELIZABETH GARBE,
 CHAS. E. POTTS.